United States Patent
Yao et al.

(10) Patent No.: US 11,502,350 B2
(45) Date of Patent: Nov. 15, 2022

(54) BATTERY HEATING SYSTEM, BATTERY DEVICE AND ELECTRIC VEHICLE

(71) Applicant: Guangzhou Automobile Group Co., Ltd., Guangdong (CN)

(72) Inventors: Meng Yao, Sunnyvale, CA (US); Jiucai Zhang, Sunnyvale, CA (US); Bozhi Yang, Sunnyvale, CA (US); Qin Yang, Sunnyvale, CA (US)

(73) Assignee: GUANGZHOU AUTOMOBILE GROUP CO., LTD., Guangzhou (CN)

( * ) Notice: Subject to any disclaimer, the term of this patent is extended or adjusted under 35 U.S.C. 154(b) by 0 days.

(21) Appl. No.: 16/932,879

(22) Filed: Jul. 20, 2020

(65) Prior Publication Data
US 2022/0021053 A1    Jan. 20, 2022

(51) Int. Cl.
*H01M 10/04*        (2006.01)
*H01M 10/6571*    (2014.01)
*B60L 58/27*        (2019.01)
*H01M 10/42*        (2006.01)
*H01M 10/48*        (2006.01)
*H01M 10/615*      (2014.01)
*H01M 10/625*      (2014.01)
(Continued)

(52) U.S. Cl.
CPC ......... *H01M 10/6571* (2015.04); *B60L 58/27* (2019.02); *H01M 10/4207* (2013.01); *H01M 10/443* (2013.01); *H01M 10/486* (2013.01); *H01M 10/615* (2015.04); *H01M 10/625* (2015.04); *H01M 50/20* (2021.01); *H01M 2010/4271* (2013.01); *H01M 2220/20* (2013.01)

(58) Field of Classification Search
CPC ........... H01M 10/657; H01M 10/6571; H01M 10/655; H01M 10/615; H01M 10/617; H01M 10/625; H01M 10/4207; H01M 10/443; H01M 10/441; H01M 10/486; H01M 50/20; H01M 2010/4271; H01M 2220/20; B60L 58/27; B60L 58/24; B60L 58/18
See application file for complete search history.

(56) References Cited

U.S. PATENT DOCUMENTS 10,297,881 B2 *    5/2019   Shen ..................... B60L 58/27

FOREIGN PATENT DOCUMENTS

CN        105529508 A      4/2016
CN        105789734 B      6/2019
CN        106356921 B      6/2019

* cited by examiner

*Primary Examiner* — Raymond Alejandro
(74) *Attorney, Agent, or Firm* — ScienBiziP, P.C.

(57) ABSTRACT

Provided is a battery heating system, a battery device and an electric vehicle. The battery heating system includes: a battery pack having multiple battery cells; a plurality of heating resistors, each heating resistor is connected to a corresponding battery cell and is configured to heat the connected battery cell; a switching circuit, which is connected to each battery cell and each heating resistor; a controller, which is connected to the switch circuit and is configured to select one or more battery cells for discharging and one or more battery cells to be heated from the plurality of battery cells according to the temperature and/or energy of each battery cell, and control switches in the switching circuit to switch on/off, so that the current of the one or more battery cells for discharging flows through the corresponding heating resistor to heat the one or more battery cells to be heated.

20 Claims, 4 Drawing Sheets

(51) Int. Cl.
*H01M 10/44* (2006.01)
*H01M 50/20* (2021.01)

BATTERY HEATING SYSTEM, BATTERY DEVICE AND ELECTRIC VEHICLE

TECHNICAL FIELD

The present disclosure relates to the field of battery heating, and particularly to a battery heating system, a battery device and an electric vehicle.

BACKGROUND

Battery pack is the most important part in the new energy vehicles (VEs), and uniform temperature profile in a battery pack is highly desired to extend battery life in new energy vehicles. Currently in most pure EVs the electric energy from the battery itself is used to heat up battery in cold winter. The less energy is used to heat the battery, the more energy can be used to drive vehicle and thus the higher the range. Also, in most battery pack design, the battery pack is heated as a whole by circulating coolant through the pack, and all cells heat up or cool down together at same time. It is highly desired if the cells in the pack can be controlled and heated individually to the same temperature, to extend battery life and save energy.

On the other hand, as time goes each battery cell inside the battery pack will show increasingly more variation in usable capacity. Then the total useful capacity of battery pack is limited by the lowest capacity of cells. Currently most battery pack are balanced passively by discharging the cells with higher SOC or voltage (depending on the adopted battery balancing algorithm, which could be SOC based or voltage-based) over an electric resistor during driving or parking time.

As mentioned above, in most battery pack, the operations of battery heating and battery balancing are performed separately. Therefore, it is more time consuming and laborious. In addition, the discharge operation of battery balancing also results in wasted energy.

It is to be noted that the information disclosed in this Background of the disclosure is only for enhancement of understanding of the general background of the present disclosure and should not be taken as an acknowledgement or any form or suggestion that this information forms the prior art already know to a person skilled in the art.

SUMMARY

Embodiments of the present disclosure provide a battery heating system, a battery device and an electric vehicle, which can realize the simultaneous battery heating and balancing, and can overcome the above problems or at least solve part of the above problems.

According to an embodiment of the present disclosure, a battery heating system is provided, and the battery heating system includes: a battery pack having multiple battery cells; a plurality of heating resistors, each heating resistor is connected to a corresponding battery cell and is configured to heat the connected battery cell; a switching circuit, which is connected to each battery cell and each heating resistor; a controller, which is connected to the switch circuit and is configured to select one or more battery cells for discharging and one or more battery cells to be heated from the plurality of battery cells according to the temperature and/or energy of each battery cell, and control switches in the switching circuit to switch on/off, so that the current of the one or more battery cells for discharging flows through the corresponding heating resistor to heat the one or more battery cells to be heated.

In an exemplary embodiment, the controller is further configured to control heating power of each heating resistor by keeping the switches in the switch circuit in an on or off state for a preset length of time.

In an exemplary embodiment, the controller is further figured to control heating power of each heating resistor by maintaining the pulse width modulation of the switches in the switching circuit.

In an exemplary embodiment, the energy of the battery cell is characterized by at least one of the following parameters: SOC, OCV, and capacity.

In an exemplary embodiment, the heating resistor is located outside the battery cell to which the heating resistor corresponds.

In an exemplary embodiment, the heating resistor is located inside the battery cell to which the heating resistor corresponds.

In an exemplary embodiment, the heating power of the heating resistors is set according to power of the battery pack.

In an exemplary embodiment, each battery cell corresponds to one or more heating resistors.

In an exemplary embodiment, the heating resistors are adjustable heating resistors, and the controller is configured to adjust the heating power of the heating resistor.

In an exemplary embodiment, heating power of the plurality of heating resistors are not the same.

According to another embodiment of the present disclosure, a battery device is provided. The battery device includes the battery heating system as mentioned in above embodiments.

According to another embodiment of the present disclosure, an electric vehicle is provided. The electric vehicle includes the battery heating system as mentioned in above embodiments.

Through the above embodiments of the present disclosure, the battery balancing is combined with the battery heating process. The battery cells with higher energy/temperature are discharged to heat up the cells with lower energy/temperature, so that the battery balancing can be realized during battery heating process. In addition, the heat released from higher energy cells during balancing is not wasted, and instead used to heat up cells with lower temperature.

BRIEF DESCRIPTION OF THE DRAWINGS

The drawings described here are adopted to provide a further understanding to the present disclosure and form a part of the application. Schematic embodiments of the present disclosure and descriptions thereof are adopted to explain the present disclosure and not intended to form limits to the present disclosure. In the drawings.

DETAILED DESCRIPTION OF THE EMBODIMENTS

The present disclosure will be described below with reference to the drawings and in combination with the embodiments in detail. It is to be noted that the embodiments in the application and characteristics in the embodiments may be combined with conflicts.

Embodiment 1

Figure 1:
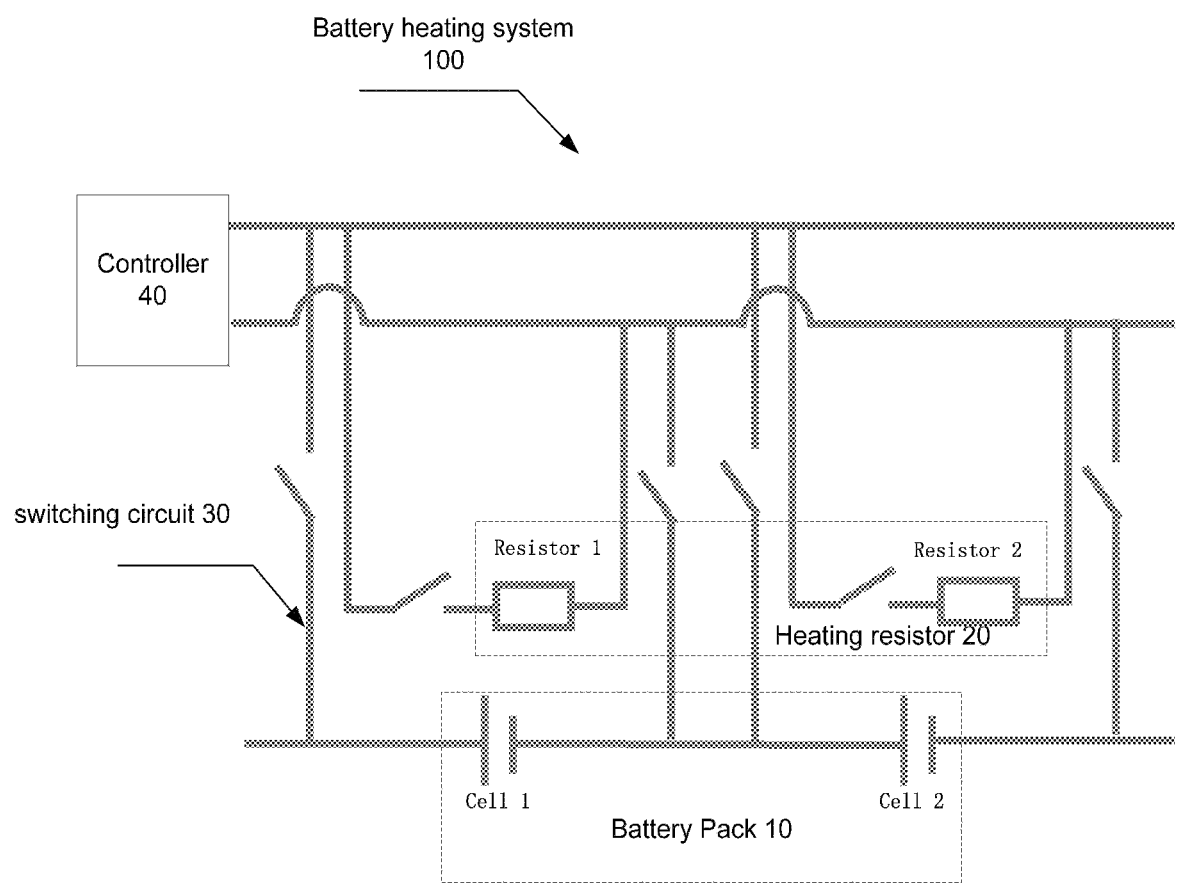
FIG. 1 is a schematic diagram of a battery heating system according to an embodiment of the present disclosure.

In most battery pack, battery heating and battery balancing are designed separately, with little consideration on combing them. The present embodiment provides a solution to combine the battery balancing and battery heating together. FIG. 1 is a schematic diagram of a battery heating system according to the present embodiment.

As shown in FIG. 1, the battery heating system 100 includes: a battery pack 10, a plurality of heating resistors 20, a switching circuit 30 and a controller 40.

The battery pack 10 includes multiple battery cells. As an exemplary embodiment, only two cells (cell 1 and cell 2) are schematically shown in the FIG. 1, and the two cells are connected in series.

As an exemplary embodiment, the plurality of heating resistors 20 includes two heating resistors: heating resistor 1 and resistor 2. Each heating resistor is connected to a corresponding battery cell and is configured to heat the connected battery cell. The location of resistors can be on the side, top or bottom of the battery cells, and the heating resistor have good contact with the battery cell to have good heat transfer with the associated cell. The heating resistor may also be built inside the battery cell 30 for the best heating effect, but the battery cell needs special and custom design.

The switching circuit 30 is connected to each battery cell and each heating resistor. The switching circuit 30 includes multiple switches, and the current flows in the switching circuit 30 can be controlled by turn on or off these switches.

The controller 40 is connected to the switch circuit 30, and the controller 40 is configured to select one or more battery cells for discharging and one or more battery cells to be heated from the plurality of battery cells according to the temperature and/or energy of each battery cell, and control switches in the switching circuit 50 to switch on/off, so that the current from the one or more battery cells for discharging flows through the corresponding heating resistor to heat the one or more battery cells to be heated.

In the present disclosure, each battery cell is connected to an external heating resistor which is in good contact with the cell and thus can heat the cell effectively. Note that in the battery, the resistor theoretically may also be placed inside the cell, which is even more desired for optimal battery heating purpose. But this internal heating requires cell design and manufacturing change. To heat up a battery, electric energy stored in battery cells with higher temperature and/or higher energy is used to heat up the battery cells with lower temperature. The discharged electric current flows through the heating resistor and warms up the battery cell by joule heating directly. Therefore it can achieve both battery heating and cell balancing simultaneously in the same process.

In an exemplary embodiment, the controller is further configured to control heating power of each heating resistor by keeping the switches in the switch circuit in an on or off state for a preset length of time.

In an exemplary embodiment, the controller is further figured to control heating power of each heating resistor by maintaining the pulse width modulation of the switches in the switching circuit.

In an exemplary embodiment, the energy of the battery cell is characterized by at least one of the following parameters: SOC, OCV, and capacity.

In an exemplary embodiment, the heating resistor is located outside the battery cell to which the heating resistor corresponds.

In an exemplary embodiment, the heating resistor is located inside the battery cell to which the heating resistor corresponds.

In an exemplary embodiment, the heating power of the heating resistors is set according to power of the battery pack.

In an exemplary embodiment, each battery cell corresponds to one or more heating resistors.

In an exemplary embodiment, the heating resistors are adjustable heating resistors, and the controller is configured to adjust the heating power of the heating resistor.

In an exemplary embodiment, heating power of the plurality of heating resistors are not the same.

Embodiment 2

In most electric vehicles, when battery heating is needed, coolant (or refrigerant) is heated first by a heating element (or coolant heater), and then battery is heated by circulating the warm coolant thorught the pack. In this battery heating method, all cells in the heating fluid branch are heated altogether at the same time.

In the present embodiment, The battery cells are heated directly through specific resistors, which can be outside or inside the battery cells. Also, in the present embodiment, it allows selectively heating individual cells by using the battery balanceing heat which is otherwise wasted.

Figure 2:
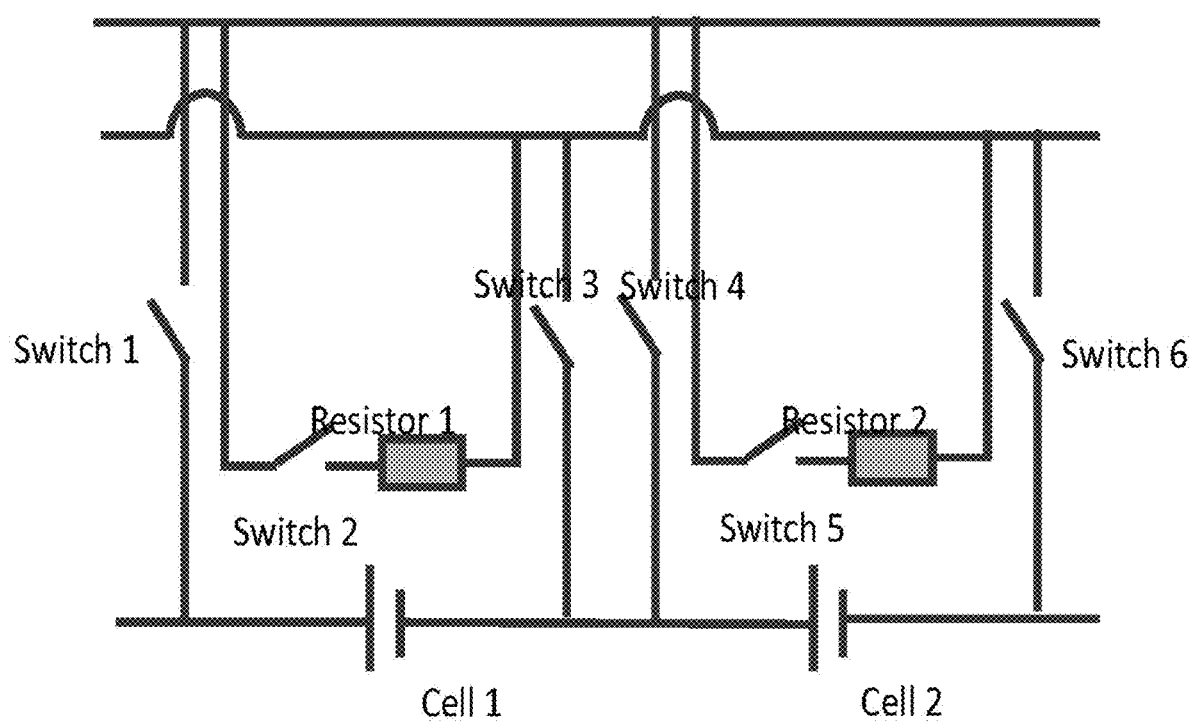
FIG. 2 is a schematic diagram of a battery heating circuit with two cells according to another embodiment of the present disclosure.

In the present embodiment, a set of physical instrument is used to realize both heating and battery balancing simultaneously. FIG. 2 is a schematic diagram of a battery heating circuit according to the present embodiment.

As shown in FIG. 2, a battery heating circuit includes cell 1 and cell 2, and cell 1 and cell 2 are connected in series. The battery heating circuit further includes two resistors, and resistor 1 is used to heat up battery cell 1, and resistor 2 is used to heat up battery cell 2. The switches in the battery heating circuit are used for controlling the current flows of the heating circuit. Battery cell 1 is heated when current flows through resistor 1, and battery cell 2 is heated when current flows through resistor 2.

In the present embodiment, the location of resistors can be on the side, top or bottom of the battery cells, and the resistors have good contact with the cells to have good heat transfer with the associated cell. The resistors may also be built inside the cells for the best heating effect, but the cell needs special and custom design.

For better understanding of the present embodiment, some control strategies are provided to achieve thermal balancing and energy balancing together:

Control strategy 1: if cell 1 and cell 2 are already electrically balanced (for example, they have the same SOC or OCV) and both only need heating, energy from each cell will be used to heat itself individually:

a) The switches 1, 2 and 3 are switched on, and the switches 4, 5 and 6 are switched off, so the resistor 1 is activated to heat up the cell 1.

b) The switches 4, 5 and 6 are switched on, and the switches 1, 2 and 3 are switched off, so the resistor 2 is activated to heat up the cell 2.

If the same amount of energy is discharged from the resistor 1 and resistor 2, then the cell 1 and cell 2 will be heat up by the same temperature raise ΔT. If the energy discharged from the resistor 1 and the resistor 2 can be different, then the cell 1 and the cell 2 will be heat up by different temperature rise ΔT.

The amount of heat from resistor 1 and resistor 2 can be optimized considering both actual need for thermal balancing or electric balancing. For example, in some situations, battery balancing maybe more critical than electric balancing, in other situations, electric balancing is more important than battery balancing.

Note that the process a) and b) above can't be realized at the same time. Instead they can be switched sequentially or alternately during the process to heat each cell.

Control strategy 2: if the electric energy of cell 1 is higher than that of cell 2, and both cells need heating, then cell 1 is discharged to heat both cells.

In this control strategy, the switches 1, 2, 3 and 5 are switched on, and the switch 4 and 6 are switched off, so the resistors 1 and 2 are connected with cell 1, and cell 1 and cell 2 are heated by resistor 1 and resistor 2, respectively.

Control strategy 3: if the energy of cell 2 is higher than that of cell 1, and both cells need heating, then cell 2 is discharged to heat both cell 1 and cell 2.

In this control strategy, the switches 2, 4, 5 and 6 are switched on, and the switches 1 and 3 are switched off, so the resistor 1 and the resistor 2 are connected with the cell 2, and the cell 1 and the cell 2 are heated by the resistor 1 and the resistor 2, respectively.

Control strategy 4: if the energy of cell 1 is higher than that of cell 2, and only cell 2 needs heating, then cell 1 is discharged to heat cell 2.

In this control strategy, the switches 1, 3 and 5 are switched on, and the switches 2, 4 and 6 are switched off, so the resistor 2 is connected with the cell 1, and the cell 2 is heated by the resistor 2.

Control strategy 5: if the energy of cell 2 is higher than that of cell 1, and only cell 1 needs heating, then Cell 2 is discharged to heat cell 1.

In this control strategy, the switches 2, 4 and 6 are switched on, and the switches 1, 3 and 5 are switched off, so the resistor 1 is connected with cell 2, and cell 1 is heated by the resistor 1.

In the above control strategies, the switches may be kept on or off continuously for a long period of time (analog mode), or Pulse-Width Modulation (digit mode) to control heating power for each resistor.

The above control strategies 1 to 5 are just some basic modes, and one mode can be dynamically switched from one to another as the condition changes. For example, assume that at the beginning, the energy of cell 1 is higher than that of cell 2, and both cells need heating, then mode 2 is first used. The cell 1 is discharged to heat both cells. After a while, cell 1 and cell 2 may be electrically balanced, but their temperatures are still lower than T_target and need heating. Then the control strategy 1 can be used to continue heating the cells until the temperatures of both cells reach the T_target. During this period, when temperature of one cell reaches T_target, switches can be switched off to stop heating that cell, and only heat the other cell until its temperature also reach the threshold T_target. After the above steps are performed, both the temperatures and electric energy of cells can be balanced within a reasonable target.

The above control strategies 1 to 5 are just some examples. There may be various other control algorithms to achieve heating and battery balancing simultaneously.

Embodiment 3

In the present embodiment, the battery cells are a group of cells, such as modules. Therefore, the thermal and electric balancing solution can be used and extended to module level in the present embodiment.

Figure 3:
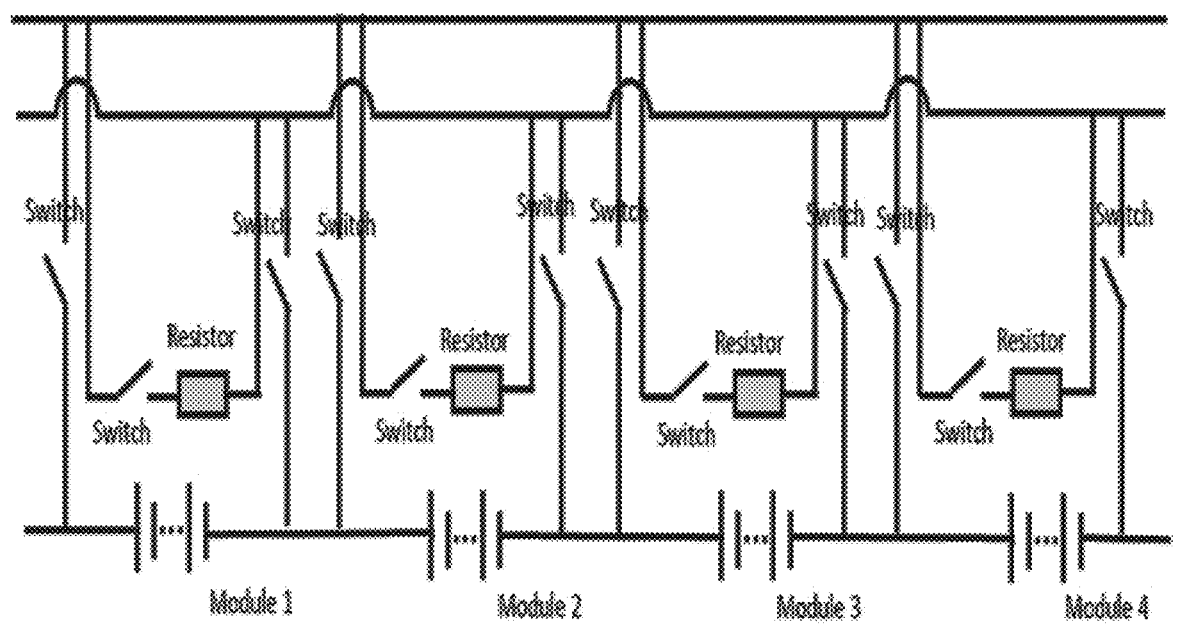
FIG. 3 is a schematic diagram of a battery heating circuit with more cells according to another embodiment of the present disclosure.

FIG. 3 is a schematic diagram of a battery heating circuit with more cells according to the present embodiment. As shown in FIG. 3, this battery heating circuit can be applied to more cells or modules that are connected in series. For example, in FIG. 3, battery heating circuit includes four battery modules and four resistors. Each resistor is used to heat a corresponding battery module. The control strategy in the present embodiment is similar to that of embodiment 2, and will not be described here.

The solution of the embodiment can be extended to more general. The solution actually can be used to achieve any combination of temperature and electric energy profiles, which are not just limited to and are far broader than the uniform temperature and uniform SOC profile. For example, there may be other simultaneous cell heating and balancing goals, which is to achieve non-uniform temperature and non-uniform electric energy (such as, SOC, capacity or OCV) between cells within the battery pack in certain situation. Various algorithms may be used to achieve the desired combination of temperature and SOC of each cell of the pack. This is because in some situations, non-uniform temperature and non-uniform SOC may be desired, to account for variation between each cell within the battery pack, such as, aging status, health, capacity variation, thermal property etc.

Embodiment 4

Figure 4:
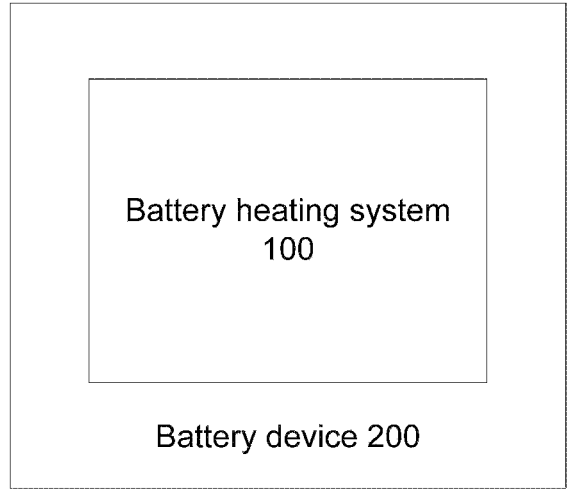
FIG. 4 is a schematic diagram of a battery device according to an embodiment of the present disclosure.

In the present embodiment, a battery device 200 is provided. As shown in FIG. 4, the battery device 200 includes the battery heating system 100 as mentioned in above embodiments.

As described in above, in the present embodiment the battery heating system 100 can achieve both battery heating and battery balancing simultaneously in the same process.

In the present application, some of the benefits of the battery device 200 may include:

1. The battery can be heated fast (due to direct and in-situ heating of cells) and with less energy (e.g., no need to heat up coolant etc.).

2. The new concept allows selectively heating individual cells, instead of heating all the cells which are associated with the fluid branch in the fluid cooling/heating circuit.

3. More importantly, battery heating and balancing can be realized at the same time, by selectively discharging cells of higher capacity to resistors that are associated to the cells lower temperature.

Embodiment 5

In most electric vehicles, when battery heating is needed, coolant (or refrigerant) is heated first by a heating element (or coolant heater), and then battery is heated by circulating the warm coolant thorught the pack. In this battery heating method, all cells in the heating fluid branch are heated altogether at the same time.

Figure 5:
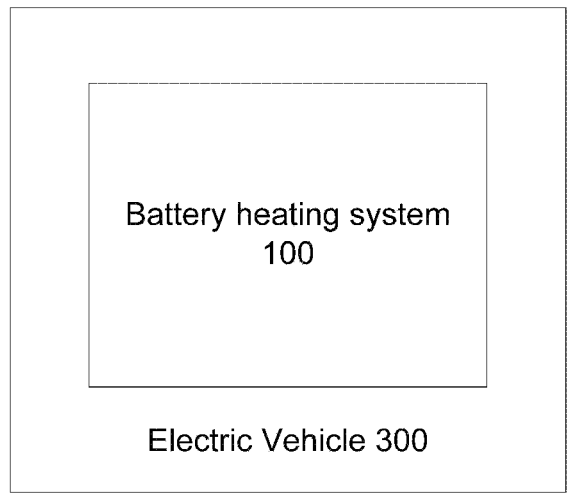
FIG. 5 is a schematic diagram of an electric vehicle according to an embodiment of the present disclosure.

In the present embodiment, an electric vehicle 300 is provided. As shown in FIG. 5, the electric vehicle 300 includes the battery heating system 100 as mentioned in above embodiments.

In the present embodiment, the battery heating system 100 can help to heat up the battery cells of the electric vehicle quickly (due to direct joule heating, thus short the heating time), and to allow heating individual cells with lower temperature, instead of heat up all cells, thus save energy and extent driving range, and to achieve temperature balancing and electric energy balancing at the same time, thus better protection of battery and longer battery life is achieved.

It is apparent that those skilled in the art should know that each module or each step of the present disclosure may be implemented by a universal computing device, and the modules or steps may be concentrated on a single computing device or distributed on a network formed by a plurality of computing devices, and may in an embodiment be implemented by program codes executable for the computing devices, so that the modules or the steps may be stored in a storage device for execution with the computing devices, the shown or described steps may be executed in sequences different from those described here in some circumstances, or may form each integrated circuit module respectively, or multiple modules or steps therein may form a single integrated circuit module for implementation. Therefore, the present disclosure is not limited to any specific hardware and software combination.

The above is only the exemplary embodiments of the present disclosure and not intended to limit the present disclosure. For those skilled in the art, the present disclosure may have various modifications and variations. Any modifications, equivalent replacements, improvements and the like shall fall within the scope of protection of the present disclosure.

What is claimed is:

1. A battery heating system, comprising:
   a battery pack having multiple battery cells;
   a plurality of heating resistors, each of the plurality of heating resistors is connected to a corresponding battery cell of the multiple battery cells and is configured to heat the corresponding battery cell;
   a switching circuit, which is connected to each of the multiple battery cells and each of the plurality of heating resistors;
   a controller, which is connected to the switch circuit and is configured to select one or more battery cells for discharging from the multiple battery cells and one or more battery cells to be heated from the multiple battery cells according to a temperature and an energy of each of the multiple battery cells, and control a plurality of switches in the switching circuit to switch on/off, so that current of the one or more battery cells for discharging flows through one or more corresponding heating resistors of the plurality of heating resistors to heat the one or more battery cells to be heated, and so that energy stored in the one or more battery cells for discharging with higher energy is used to heat at least one of the multiple battery cells with lower energy of the one or more battery cells to be heated, to balance the energy between at least two of the multiple battery cells.

2. The battery heating system as claimed in claim 1, wherein the controller is further configured to control heating power of at least one of the plurality of heating resistors by keeping the plurality of switches in the switch circuit in an on or off state for a preset length of time.

3. The battery heating system as claimed in claim 1, wherein the controller is further figured to control heating power of at least one heating resistor by maintaining the pulse width modulation of the switches in the switching circuit.

4. The battery heating system as claimed in claim 1, wherein the energy of each of the multiple battery cells is characterized by at least one of the following parameters: SOC, OCV, and capacity.

5. The battery heating system as claimed in claim 1, wherein at least one of the plurality of heating resistors is located outside each of the multiple battery cells to which at least one of the plurality of heating resistors corresponds.

6. The battery heating system as claimed in claim 1, wherein at least one heating resistor is located inside the battery cell to which at least one heating resistor corresponds.

7. The battery heating system as claimed in claim 1, wherein heating power of the plurality of heating resistors are set according to power of the battery pack.

8. The battery heating system as claimed in claim 1, wherein each of the multiple battery cells corresponds to one or more heating resistors of the plurality of heating resistors.

9. The battery heating system as claimed in claim 1, wherein at least one heating resistor is adjustable heating resistor, and the controller is further configured to adjust the heating power of the at least one heating resistor.

10. The battery heating system as claimed in claim 1, wherein heating power of the plurality of heating resistors are not the same.

11. A battery device, comprising the battery heating system as claimed in claim 3.

12. An electric vehicle, comprising the battery heating system as claimed in claim 3.

13. A battery device, comprising a battery heating system, the battery heating system comprising:
   a battery pack having multiple battery cells;
   a plurality of heating resistors, each of the plurality of heating resistors is connected to a corresponding battery cell of the multiple battery cells and is configured to heat the corresponding battery cell;
   a switching circuit, which is connected to each of the multiple battery cells and each of the plurality of heating resistors;
   a controller, which is connected to the switch circuit and is configured to select one or more battery cells for discharging from the multiple battery cells and one or more battery cells to be heated from the multiple battery cells according to a temperature and an energy of each of the multiple battery cells, and control a plurality of switches in the switching circuit to switch on/off, so that current of the one or more battery cells for discharging flows through one or more corresponding heating resistors of the plurality of heating resistors to heat the one or more battery cells to be heated, and so that energy stored in the one or more battery cells for discharging with higher energy is used to heat at least one of the multiple battery cells with lower energy of the one or more battery cells to be heated, to balance the energy between at least two of the multiple battery cells.

14. The battery device as claimed in claim 13, wherein the controller is further configured to control heating power of at least one of the plurality of heating resistors by keeping the plurality of switches in the switch circuit in an on or off state for a preset length of time.

15. The battery device as claimed in claim 13, wherein the energy of each of the multiple battery cells is characterized by at least one of the following parameters: SOC, OCV, and capacity.

16. The battery device as claimed in claim 13, wherein at least one of the plurality of heating resistors is located outside each of the multiple battery cells to which at least one of the plurality of heating resistors corresponds.

17. An electric vehicle, comprising a battery device, the battery device comprising a battery heating system, the battery heating system comprising:
- a battery pack having multiple battery cells;
- a plurality of heating resistors, each of the plurality of heating resistors is connected to a corresponding battery cell of the multiple battery cells and is configured to heat the corresponding battery cell;
- a switching circuit, which is connected to each of the multiple battery cells and each of the plurality of heating resistors;
- a controller, which is connected to the switch circuit and is configured to select one or more battery cells for discharging from the multiple battery cells and one or more battery cells to be heated from the multiple battery cells according to a temperature and an energy of each of the multiple battery cells, and control a plurality of switches in the switching circuit to switch on/off, so that current of the one or more battery cells for discharging flows through one or more corresponding heating resistors of the plurality of heating resistors to heat the one or more battery cells to be heated, and so that energy stored in the one or more battery cells for discharging with higher energy is used to heat at least one of the multiple battery cells with lower energy of the one or more battery cells to be heated, to balance the energy between at least two of the multiple battery cells.

18. The electric vehicle as claimed in claim 17, wherein the controller is further configured to control heating power of at least one of the plurality of heating resistors by keeping the plurality of switches in the switch circuit in an on or off state for a preset length of time.

19. The electric vehicle as claimed in claim 17, wherein the energy of each of the multiple battery cells is characterized by at least one of the following parameters: SOC, OCV, and capacity.

20. The electric vehicle as claimed in claim 17, wherein at least one of the plurality of heating resistors is located outside each of the multiple battery cells to which at least one of the plurality of heating resistors corresponds.

\* \* \* \* \*